Figure 1:
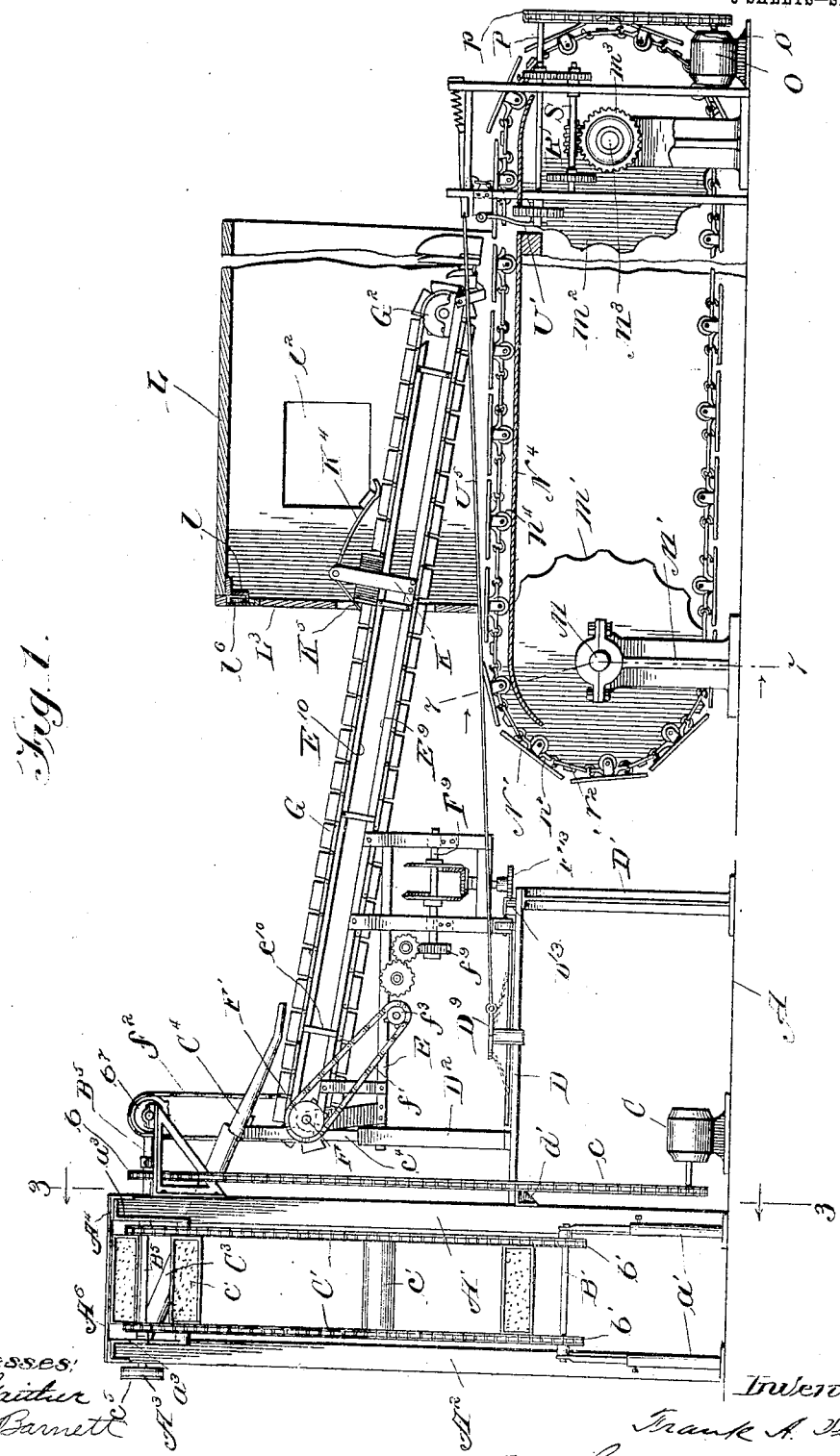

No. 803,720. PATENTED NOV. 7, 1905.
F. A. SHUNK.
COMBINED CONVEYER AND LEER.
APPLICATION FILED FEB. 14, 1903. RENEWED APR. 9, 1904.

9 SHEETS—SHEET 6.

Witnesses: Inventor:
Frank A. Shunk
by Chamberlin & Wilkinson
Attorneys.

No. 803,720. PATENTED NOV. 7, 1905.
F. A. SHUNK.
COMBINED CONVEYER AND LEER.
APPLICATION FILED FEB. 14, 1903. RENEWED APR. 9, 1904.
9 SHEETS—SHEET 7.
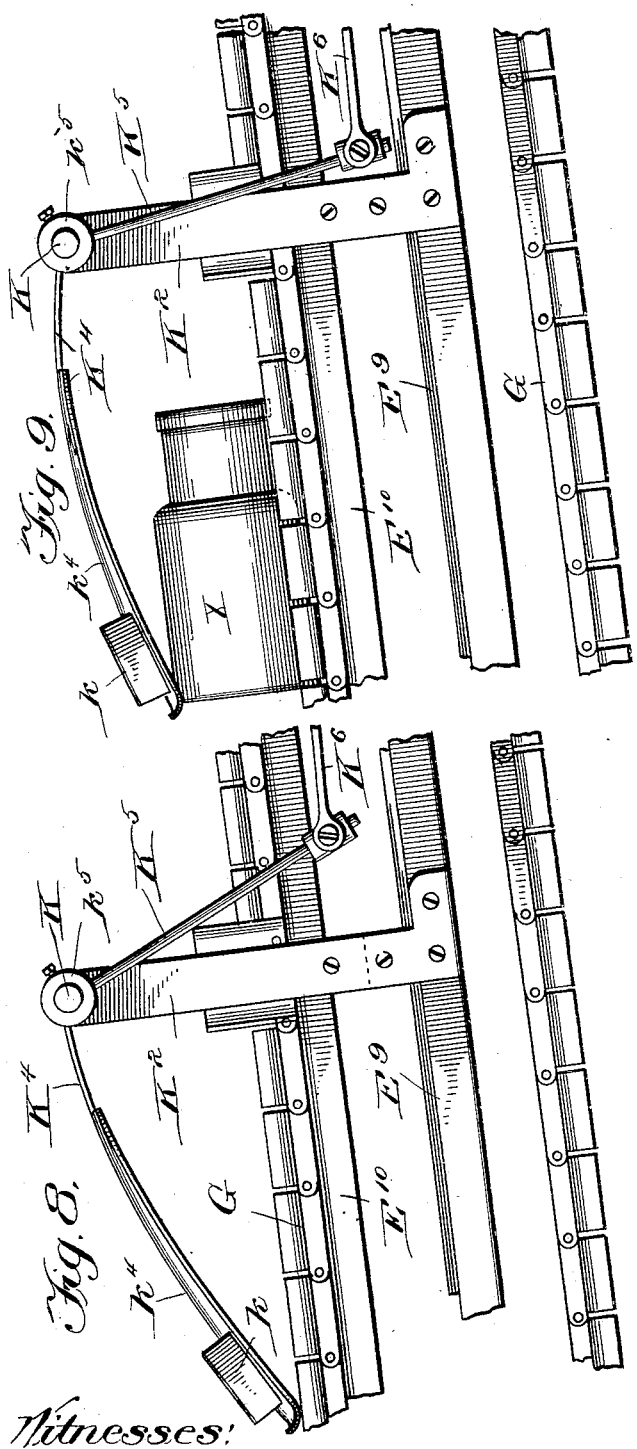
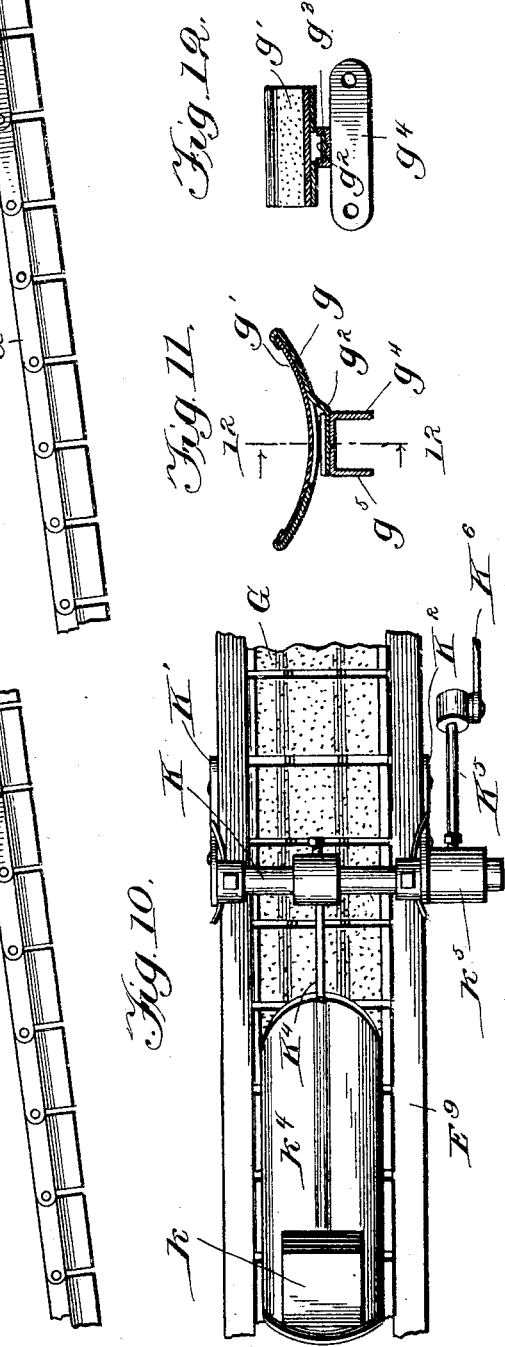
Witnesses:
H. S. Gaither
J. E. Barnett
Inventor:
Frank A. Shunk
by Chamberlin & Wilkinson
Attorneys.

No. 803,720. PATENTED NOV. 7, 1905.
F. A. SHUNK.
COMBINED CONVEYER AND LEER.
APPLICATION FILED FEB. 14, 1903. RENEWED APR. 9, 1904.

9 SHEETS—SHEET 8.

Witnesses:
H. S. Gaither
J. E. Barnett

Inventor:
Frank A. Shunk
by Chamberlin & Williams
Attorneys.

No. 803,720. PATENTED NOV. 7, 1905.
F. A. SHUNK.
COMBINED CONVEYER AND LEER.
APPLICATION FILED FEB. 14, 1903. RENEWED APR. 9, 1904.
9 SHEETS—SHEET 9.
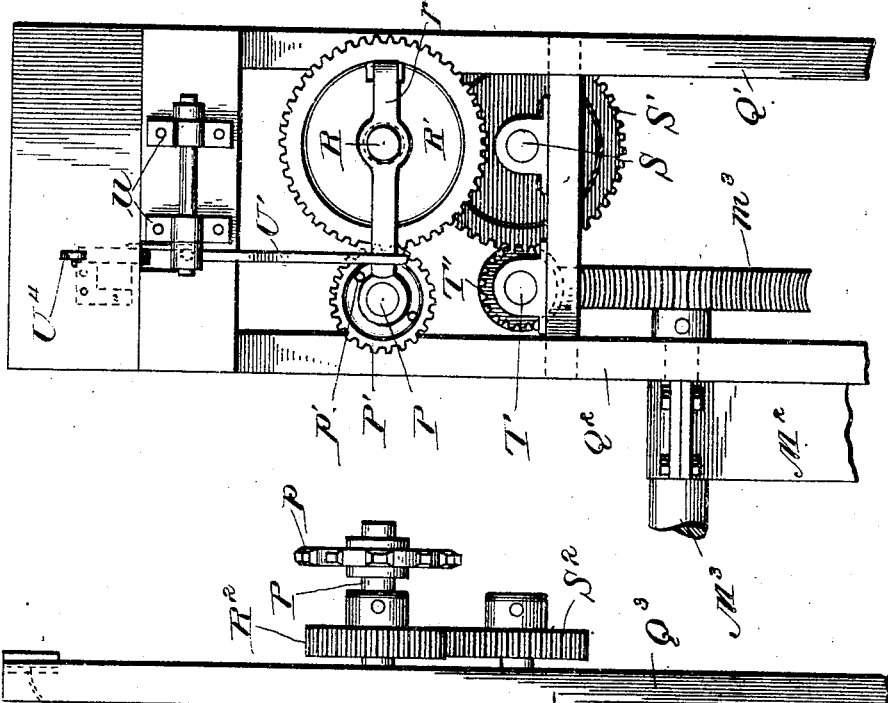
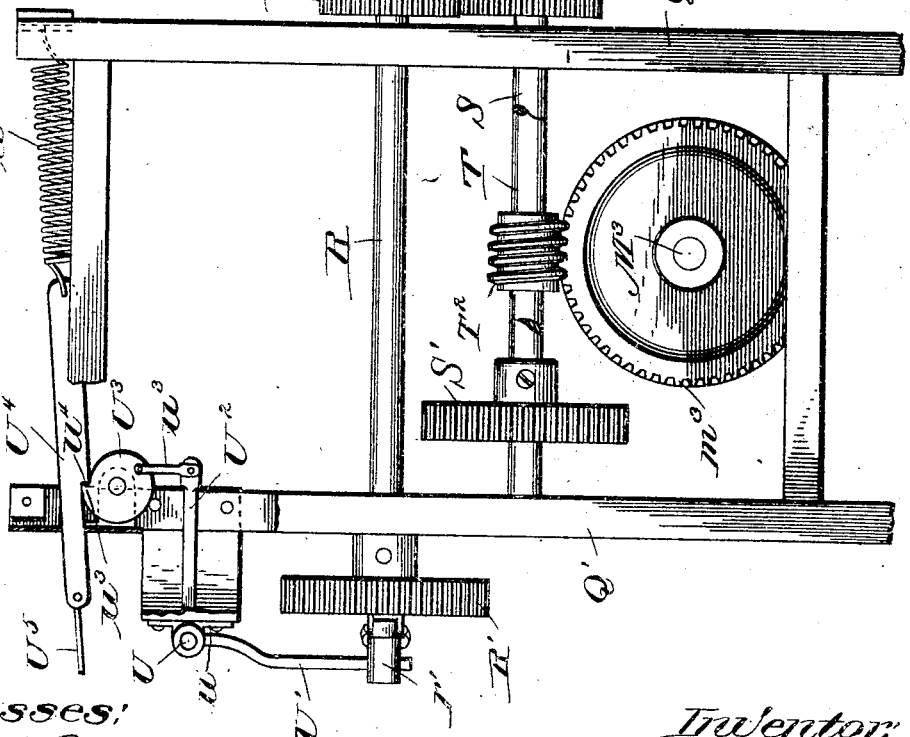

UNITED STATES PATENT OFFICE.

FRANK A. SHUNK, OF STREATOR, ILLINOIS.

COMBINED CONVEYER AND LEER.

No. 803,720. Specification of Letters Patent. Patented Nov. 7, 1905.

Application filed February 14, 1903. Renewed April 9, 1904. Serial No. 202,443.

*To all whom it may concern:*

Be it known that I, FRANK A. SHUNK, a citizen of the United States, residing at Streator, county of Lasalle, State of Illinois, have invented a certain new and useful Improvement in a Combined Conveyer and Leer; and I declare the following to be a full, clear, and exact description of the invention, such as will enable others skilled in the art to which it pertains to make and use the same, reference being had to the accompanying drawings, which form a part of this specification.

My invention relates generally to leers or annealing-ovens, and more particularly to apparatus for conveying the articles of ware to be annealed into and through the leer.

In the manufacture of glass and other ware the articles after being formed in the desired shapes are conveyed to and placed in a leer, from which they are removed after the completion of the annealing process.

The object of my invention is to provide apparatus for conveying to the leer the ware which is to be annealed from the place where it is formed into the desired articles and introducing the ware into and carrying it through the leer, thereby avoiding all manual handling of the ware after it is formed until it is delivered from the leer.

A further object of my invention is to provide an apparatus for carrying the formed articles to the leer, automatically introducing the articles into the leer in series of regular rows extending laterally across the leer, moving the rows of articles step by step longitudinally through the leer, and delivering the rows of articles successively from the leer.

A further object of my invention is to provide a combined leer and conveyer which will be comparatively simple in construction and efficient in operation.

My invention generally described consists in a carrier for receiving the ware after it has been formed, a conveyer upon which the ware is delivered by the carrier and by which it is deposited in the leer, a leer into which the conveyer extends, means for swinging the conveyer transversely across the leer, thereby depositing the articles in rows, a belt or apron movable longitudinally within the leer upon which the articles are received from the conveyer, and automatically-operating connections between the carrier, conveyer, and apron, whereby the articles placed in the carrier are delivered upon the conveyer, are then arranged in rows upon the apron in the leer, and the apron moved step by step through the leer.

My invention will be more fully described hereinafter with reference to the accompanying drawings, in which the same is illustrated as embodied in a convenient and practical form, and in which—

Figure 2:
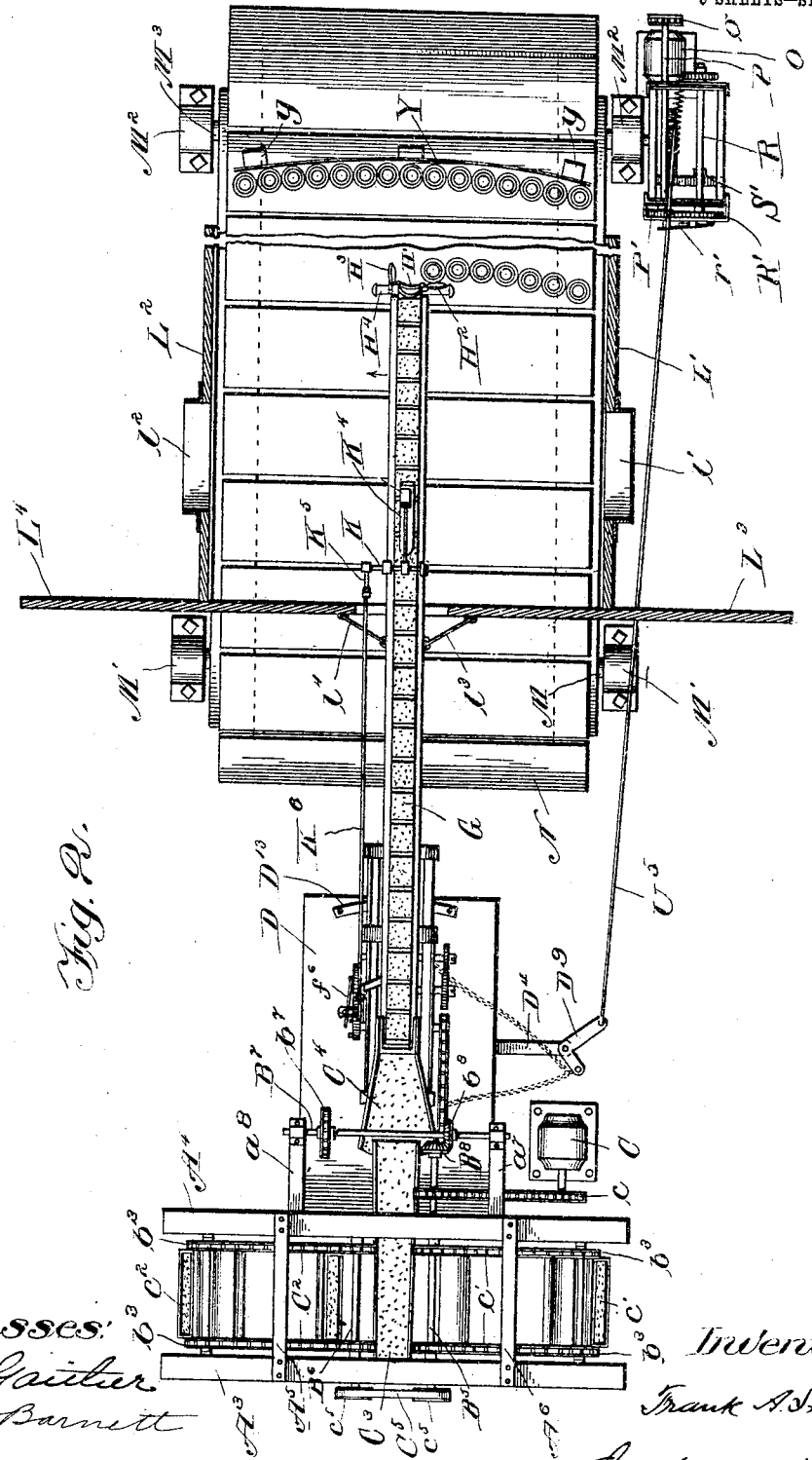
Figure 3:
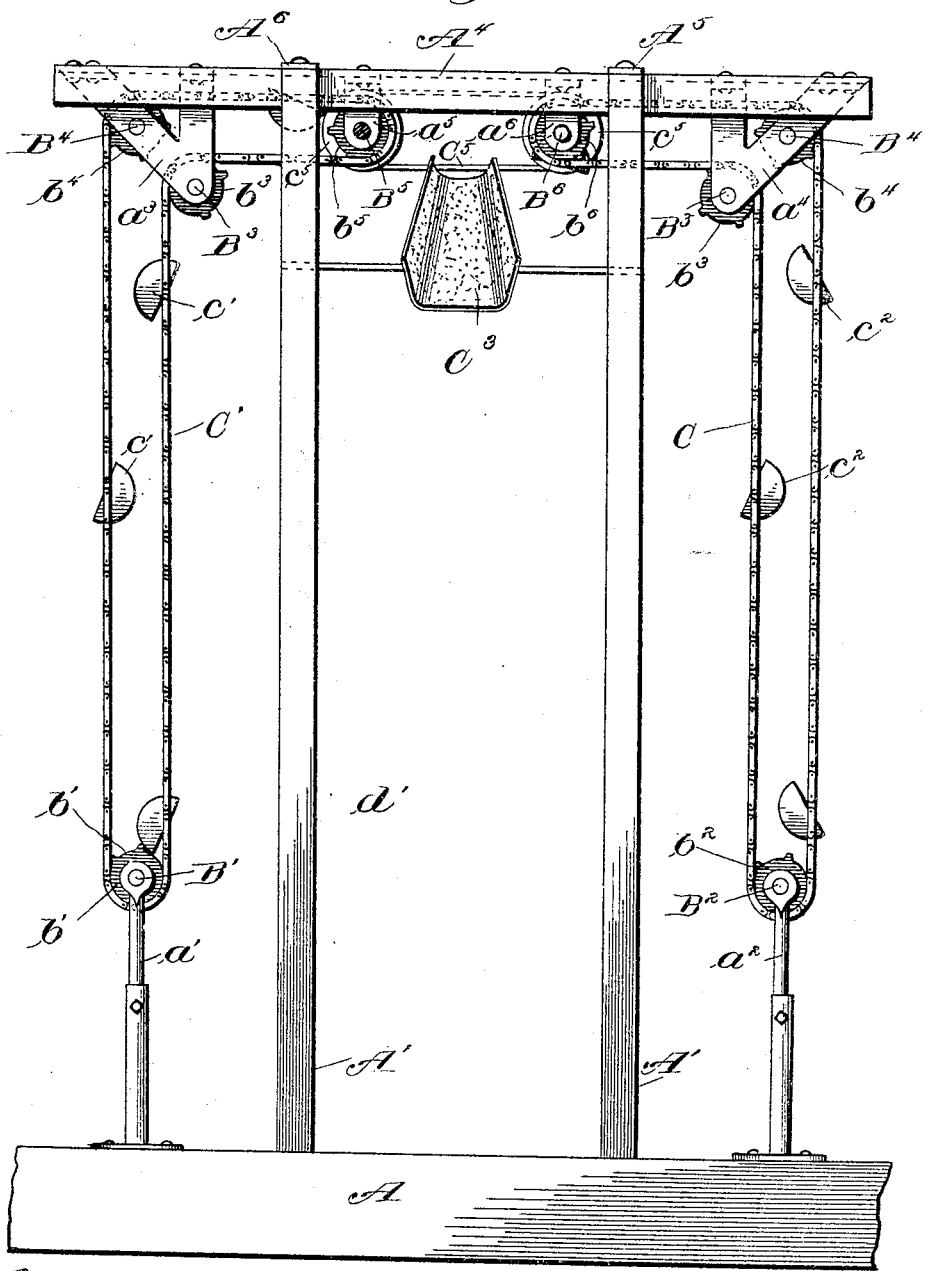
Figure 4:
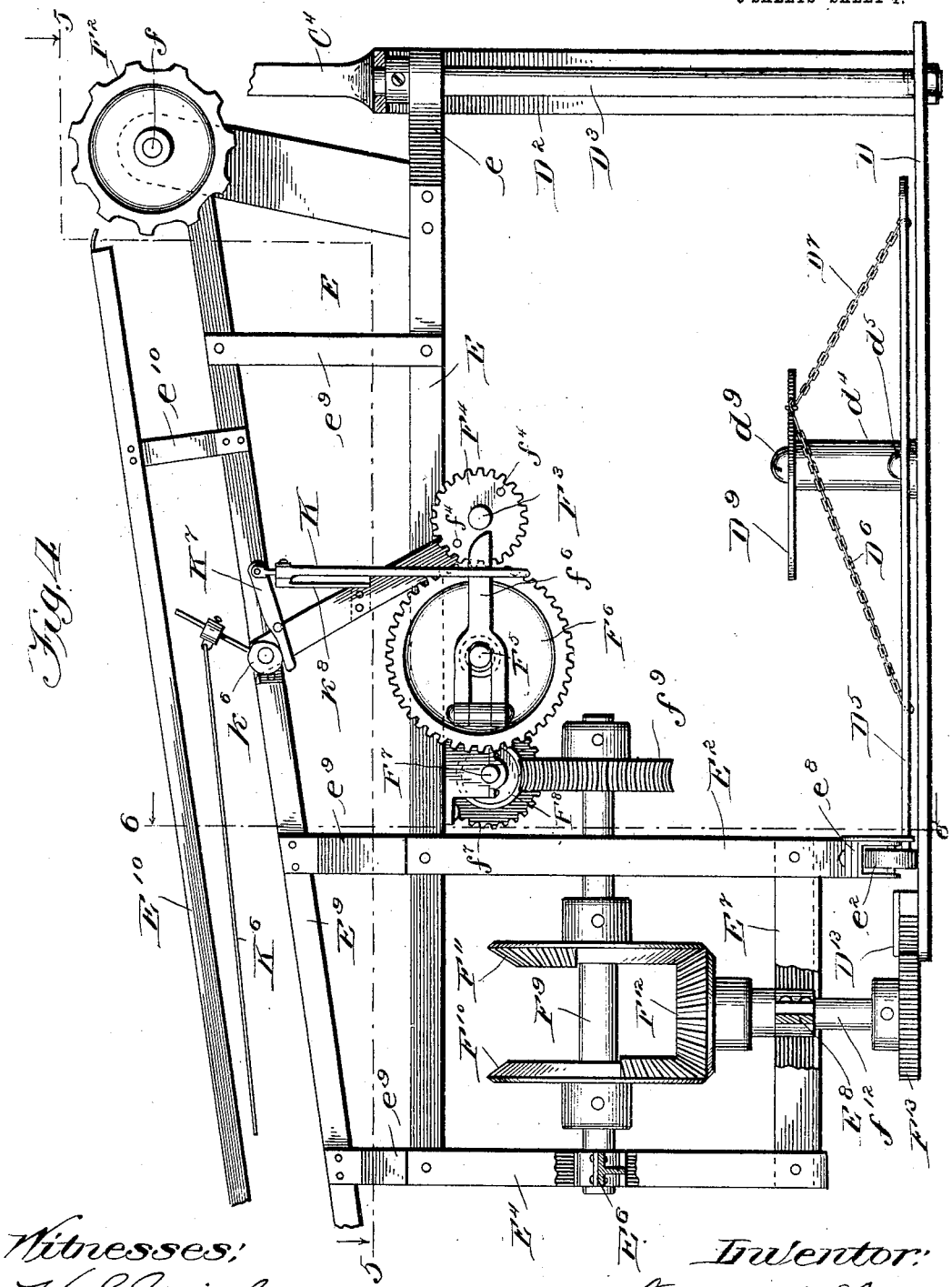
Figure 5:
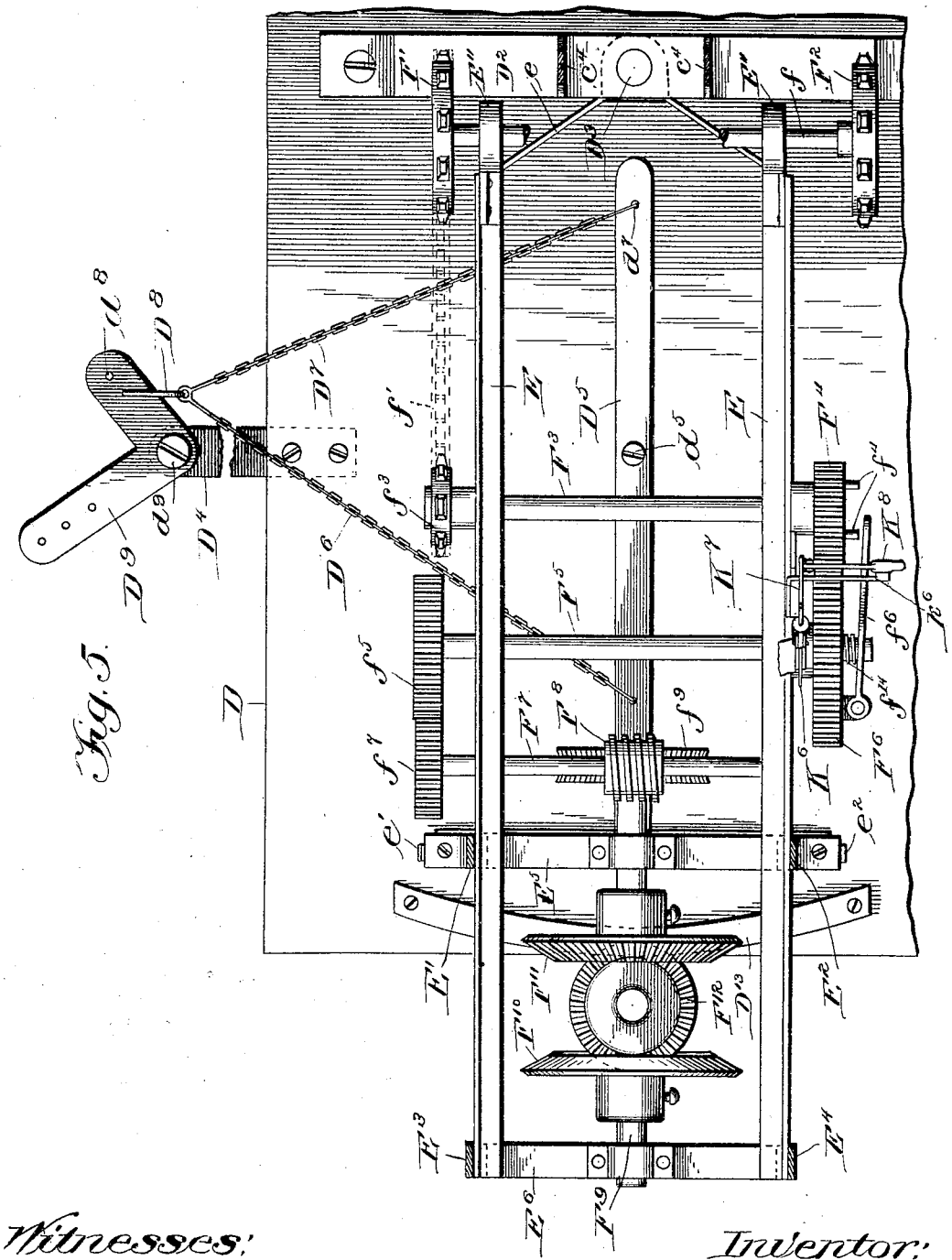
Figure 6:
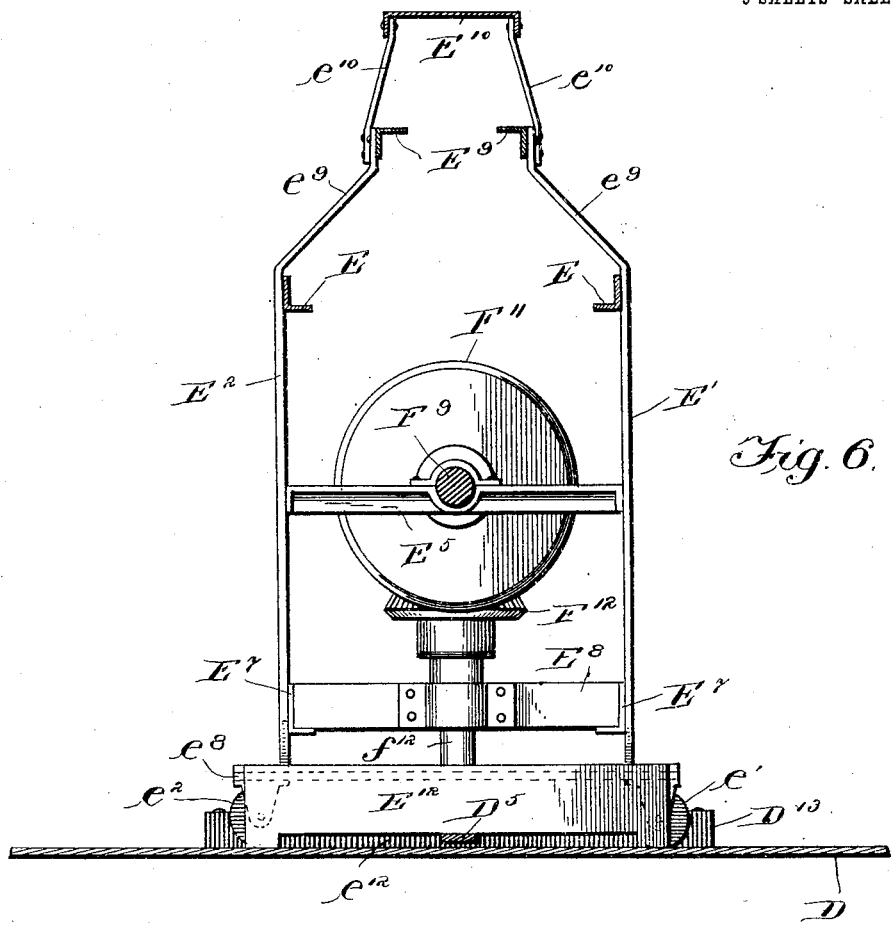
Figure 7:
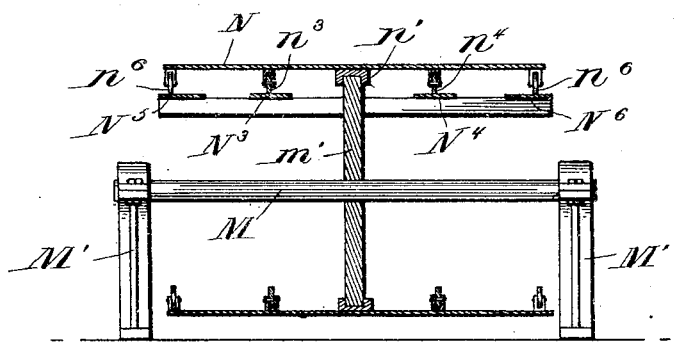
Figure 13:
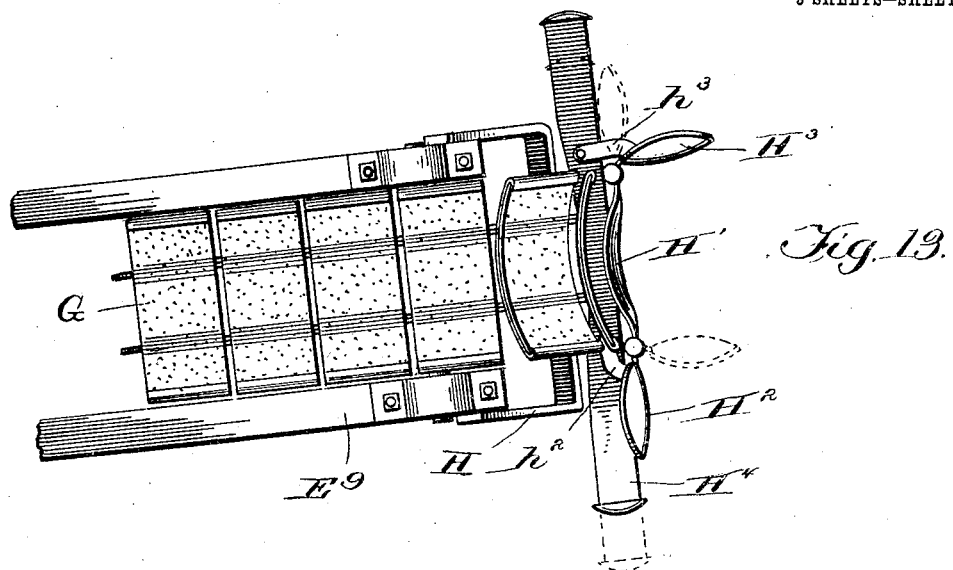
Figure 14:
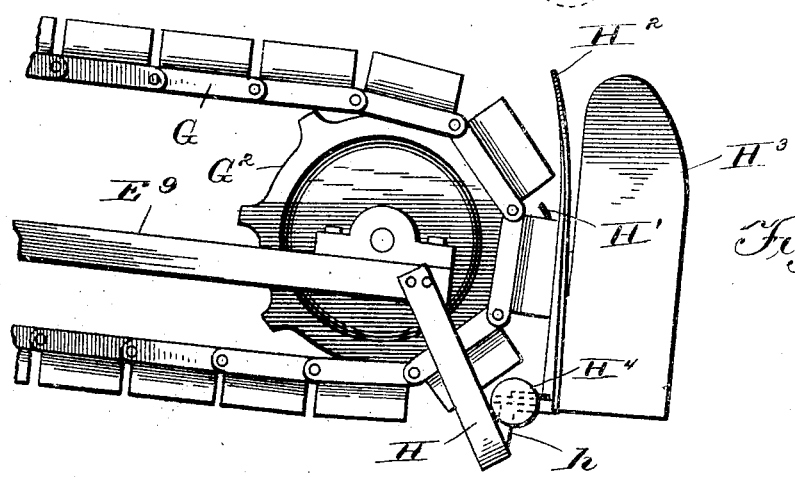
Figure 15:
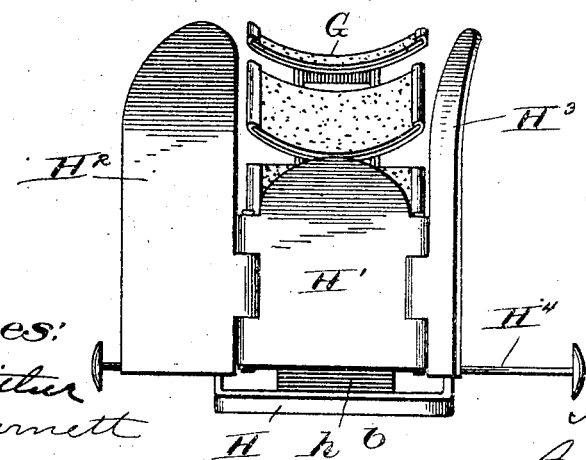

Figure 1 is a side elevational view, the leer being shown in longitudinal section; Fig. 2, a plan view, the leer being shown in section; Fig. 3, a view taken on line 3 3, Fig. 1, looking in the direction of the arrows, on a larger scale; Fig. 4, an elevational view of the upper end of the conveyer looking from the opposite side to that shown in Fig. 1; Fig. 5, a plan view of the upper end of the conveyer-frame looking downwardly in Fig. 4; Fig. 6, a sectional view on lines 6 6, Figs. 4 and 5; Fig. 7, a sectional view on line 7 7, Fig. 1; Fig. 8, an elevational view of the means for putting into operation the mechanism for swinging the conveyer; Fig. 9, a view similar to Fig. 8 with the parts in an adjusted position; Fig. 10, a plan view of the construction shown in Fig. 8; Fig. 11, a transverse view through one of the links of the conveyer; Fig. 12, a view taken on line 12 12, Fig. 11; Fig. 13, a plan view of the lower end of the conveyer; Fig. 14, a side elevational view of the structure shown in Fig. 13; Fig. 15, an end elevational view of the structures shown in Figs. 13 and 14; Fig. 16, an elevational view of the mechanism for moving the apron within the leer step by step looking upwardly on Fig. 2, and Fig. 17 an elevational view looking from the left in Figs. 2 and 16.

Similar reference characters are used to indicate similar parts in the several figures of the drawings.

Three coöperating conveyers are employed in carrying out my invention, which, to distinguish them from each other, will be termed, first, the "carriers," which receive the pieces of ware after they are formed and deliver them upon the upper end of, second, the "conveyer," which receives the pieces of ware from the carriers and deposits them within the leer upon, third, the "belt," which moves step by step longitudinally within the leer and carries the articles during the annealing process and delivers them when annealed from the leer.

The structure and the operation of the three sets of conveyers will be separately described.

*The carriers.*—Reference characters A' A' indicate standards mounted upon any suitable base A and supporting at their upper ends the horizontal beam A⁴. A second pair of standards A² are mounted upon the base A in alinement with the pair of standards A'. A second horizontal beam A³ is mounted upon the upper ends of the standards A² and arranged parallel with the beam A⁴. Cross-beams A⁵ and A⁶ unite the horizontal beams A³ and A⁴ and are located above the standards in the corresponding pairs A' and A².

Depending from the corresponding ends of the horizontal beams A³ and A⁴ are pairs of brackets a³ and a⁴, respectively. (See particularly Fig. 3.) Shafts B³ are journaled in bearings formed near the lower ends of the pairs of brackets a³ and a⁴ and are provided with sprocket-wheels b³ b³, two of such sprocket-wheels being fixed upon each shaft adjacent to the supporting-brackets. A shaft B⁴ is also journaled at its opposite ends in bearings formed in each pair of brackets a³ and a⁴ and is provided with a pair of sprocket-wheels b⁴, located adjacent to the supporting-brackets. Other pairs of brackets a⁵ and a⁶ depend from the horizontal beams A³ and A⁴ and support shafts B⁵ and B⁶, respectively. The shaft B⁵ is provided with a pair of sprocket-wheels b⁵, located adjacent to the brackets a⁵, while similar sprocket-wheels b⁶ are fixed upon the shaft B⁶ and located adjacent to the brackets of the pair a⁶.

Mounted upon the base A below and in alinement with the brackets in the pair a³ are adjustable posts a', which support at their upper ends a shaft B', upon which is fixed a pair of sprocket-wheels b'. Similar extensible posts a² are mounted upon the base A beneath and in alinement with the brackets in the pair a⁴. A shaft B² is journaled in bearings at the upper ends of the extensible posts a² and is provided with a pair of sprocket-wheels b². A pair of sprocket-chains C' engage the corresponding sprocket-wheels in the pairs b' b⁵ and in the pairs b³ and b⁴, supported by the pair of brackets a³. A similar pair of sprocket-chains C² engage the corresponding sprocket-wheels in the pairs b² b⁶ and in the pairs b³ and b⁴, supported by the pair of brackets a⁴.

Holders c' to receive the articles of ware which have been formed and which are to be placed in the annealing-oven are supported between the pair of sprocket-chains C'. Similar holders c² are supported between the pair of sprocket-chains C². The holders c' and c² are of such a width that they may pass between the pairs of sprocket-wheels around which the sprocket-chains are guided. The holders c' and c² are so placed upon their respective supporting sprocket-chains that one of the holders c² will first discharge into a chute C³, and then one of the holders c' will discharge into the same chute, thereby enabling articles of ware to be placed into the holders in each of the carriers and to be deposited in the chute C³ alternately from the two carriers. The shape of the holders may be varied according to the articles of ware which are to be annealed, they being shown as half-cylinders adapted to hold bottles which have been blown and which are to be passed into the annealing-oven.

The shaft B⁵ extends laterally beyond the horizontal beam A⁴ and is provided with a sprocket-wheel b, which is engaged by a sprocket-chain c, the latter also passing around a sprocket-wheel rotated by any suitable means—such, for instance, as a motor C. The rotary motion imparted to the shaft B⁵ by the motor is communicated to the shaft B⁶ by means of any suitable power connection—such, for instance, as a belt C⁵, engaging pulleys c⁵, fixed upon the shafts B⁵ and B⁶.

*The conveyer.*—Pivotally mounted upon a support in position to receive the articles from the chute C³ is an endless conveyer which carries the articles into the leer and deposits them in rows arranged transversely upon the belt which moves longitudinally through the leer.

D indicates the table, which may be conveniently supported at one end by brackets d', fixed upon the pair of standards A', and at its other end by one or more posts D'. A frame D² of substantially inverted-U shape is mounted upon the table D and serves to support the upper end of a post D³, the lower end of which is supported by the table D. The post D³ serves as a fulcrum about which oscillates in a horizontal plane a frame for supporting the conveyer. The conveyer-frame comprises a downwardly-inclined pair of beams E⁹, which extends from a point beneath the end of the chute C³ to a point within the leer L. A guide E¹⁰ is supported parallel with and above the beams E⁹ by any suitable means—such, for instance, as struts e¹⁰. The conveyer proper, G, is guided downwardly by the guide E¹⁰ and returns beneath the pair of beams E⁹. The pair of beams E⁹ are supported above a pair of short beams E by means of a series of struts e⁹. The pair of beams E are united at one end by a strap e, which surrounds and is journaled upon the post D³ near its upper end. The ends of the short beams E opposite to the strap e are supported above the table D by an interposed structure comprising vertical posts E' and E², the lower ends of which are secured to a horizontal beam e⁸, beneath the opposite ends of which are journaled rollers e' and e², which rest upon the table D near the edge thereof opposite to the framework of the carriers. A second pair of posts E³ and E⁴ are connected to the extreme ends of the pair of beams E and are united at their lower ends by means of braces E⁷ to the posts E' and E². Cross-beams E⁵ and E⁶ extend between the pairs of posts E' and E² and E³ and E⁴.

C⁴ indicates a chute carried by the conveyer-frame by means of brackets c⁴, extending upwardly from the frame $D^3$, as clearly shown in Figs. 1, 4, and 5. This chute terminates above the conveyer and guides the articles received from the chute $C^3$ thereto.

A pair of brackets $E^{11}$ project upwardly from the ends of the beams E, adjacent to the ends thereof, to which the strap $e$ is fixed. Journaled in the upper ends of the braces $E^{11}$ is a shaft $f$ around a sprocket-wheel, upon which the upper end of the conveyer G extends. A second sprocket-wheel $G^2$ is journaled in bearings mounted upon the pair of beams $E^9$, at the lower ends thereof, around which the lower end of the conveyer passes. Motion is imparted to the conveyer by means of a sprocket-wheel $F^2$, fixed upon one end of the shaft $f$, around which passes a sprocket-chain $f^2$. The sprocket-chain $f^2$ is driven from a shaft $B^7$ around the sprocket-wheel $b^7$, on which it passes. The shaft $B^7$ is rotated by means of a bevel-gear $b^8$ thereon, which meshes with a beveled gear $B^8$ upon the end of the shaft $B^5$, thereby driving the conveyer from the motor C.

In order that the articles—such, for instance, as bottles—may be arranged in transverse rows within the leer, the conveyer-frame is swung transversely about the pivotal connection between the strap $e$ and the post $D^3$. The mechanism for imparting to the conveyer-frame such swinging motion will now be described.

A sprocket-wheel $F'$ is fixed upon the shaft $f$ at the end thereof opposite to the sprocket-wheel $F^2$. A sprocket-chain $f'$ engages the sprocket-wheel $F'$ and also passes around a sprocket-wheel $f^3$, fixed upon the end of a shaft $F^3$, the latter being journaled beneath the parallel beams E. The opposite end of the shaft $F^3$ has fixed thereon a gear-wheel $F^4$, upon the outer face of which are fixed a pair of studs $f^4$, arranged at one hundred and eighty degrees apart. Another shaft $F^5$ is journaled beneath the parallel beams E and is provided with a gear-wheel $F^6$, which meshes with the gear-wheel $F^4$. Several successive teeth on the gear-wheel $F^6$ are broken away, so that the gear-wheel $F^4$ may revolve without imparting rotary motion to the shaft $F^5$, when the space from which the teeth on the gear-wheel $F^6$ have been omitted is opposite the teeth on the gear-wheel $F^4$. A lever $f^6$ is pivotally mounted upon the outer face of the gear-wheel $F^6$ and projects beyond the periphery thereof such a distance that it overlaps the studs $f^4$ on the gear-wheel $F^4$. A spring normally retains the lever $f^6$ in the position shown in Fig. 5, thereby permitting the studs $f^4$ to pass the same. A gear-wheel $f^5$ is fixed upon the opposite end of the shaft $F^5$ and meshes with the gear-wheel $f^7$, fixed upon the end of another shaft $F^7$, the latter being journaled in bearings depending from the pair of beams E, as shown in Fig. 4. A worm $F^8$ is fixed upon the shaft $F^7$ and meshes with a worm-wheel $f^9$, fixed upon the end of a shaft $F^9$, which is journaled in bearings supported upon the cross-beams $E^5$ and $E^6$. (See Fig. 5.) Fixed upon the shaft $F^9$ are mutilated beveled gears $F^{10}$ and $F^{11}$. Each of the beveled gear-wheels is provided with teeth throughout one hundred and eighty degrees, the teeth on one wheel being opposite to the smooth surface on the other. A beveled gear $F^{12}$ is fixed upon the upper end of a stub-shaft $f^{12}$ and is adapted to be successively engaged by the teeth on the gear-wheels $F^{10}$ and $F^{11}$. The stub-shaft $f^{12}$ is journaled in a bearing supported by a cross-bar $E^8$, supported at its opposite ends by the parallel bars $E^7$. The lower end of the stub-shaft $f^{12}$ is provided with a gear-wheel $F^{13}$, which meshes with a segmental rack $D^{13}$, fixed upon the table D. The rack $D^{13}$ is disposed in the arc of a circle, the center of which is the post $D^3$.

After each bottle is deposited in the leer the conveyer should be moved transversely a distance corresponding to the width of the bottle, so that the subsequent bottle may be placed beside the preceding, as indicated in Fig. 2. As each bottle is carried by a given point on the conveyer-frame the mechanism for moving transversely the conveyer is put into operation by the following means. A pair of brackets $K'$ and $K^2$ are secured to the pair of beams $E^9$ and project above the guide $E^{10}$, as clearly shown in Figs. 1, 8, and 9. Journaled in the upper ends of the brackets $K'$ and $K^2$ is a shaft K, to which is fixed a finger $K^4$, provided with a shield $k^4$. The shield $k^4$ normally projects to a point adjacent to the upper surface of the conveyer G and is engaged by each bottle X as it passes beneath the same. A weight $k$ is preferably secured to the shield $k^4$ to insure the same returning to the position shown in Fig. 8 after the passage of a bottle beneath the same. A crank-arm $K^5$ is fixed upon the end of the shaft K by any suitable means—such, for instance, as a hub or collar $k^5$. The lower end of the crank-arm $K^5$ is pivotally connected to a rod $K^6$ or other connecting means, the other end of which is pivotally secured to a rod projecting above a cam $k^6$. (See Fig. 4.) The cam $k^6$ is mounted upon the outer side of one of the beams $E^9$. A short lever $K^7$ is pivotally supported adjacent to the cam $k^6$ and is oscillated thereby. The end of the lever $K^7$ opposite to that which is engaged by the cam is pivotally connected to the bell-crank lever $K^8$. The bell-crank lever is pivotally supported by a bracket $k^8$, suitably mounted upon the frame of the conveyer. The end of the arm of the bell-crank lever opposite to that which is pivotally connected to the lever $K^7$ extends outside of the lever $f^6$, as clearly shown in Figs. 4 and 5, and is adapted when oscillated to swing the lever $f^6$ into the path of the studs $f^4$, and thereby bring into mesh the teeth on the gear-wheels $F^4$ and $F^6$ by enabling one of the studs $f^4$, through its engagement with the lever $f^6$, to rotate the gear-wheel $F^6$ out of the position in which the space thereon without teeth is opposite the teeth on the gear-wheel $F^4$.

In order to insure the bottles being deposited in upright positions in the leer, the lower end of the conveyer-frame is provided with guides the positions of which are adjusted according to the lateral direction of movement of the conveyer-frame. Such guides are supported by means of a yoke H, which is secured to the lower ends of the beams $E^9$ and which is provided with an upwardly-projecting lug $h$. Sufficient space is allowed within the yoke and between the lug $h^4$ and the sprocket-wheel $G^2$ to permit the conveyer to freely pass therethrough. A central plate H' is secured above the lug $h$ and has pivotally secured to either side thereof side wings $H^2$ and $H^3$. The side wings $H^2$ and $H^3$ are provided with rearwardly-extending levers $h^2$ and $h^3$, respectively, which are pivoted to a bar $H^4$, slidingly mounted upon the lug $h^4$. The pivotal connection between the levers $h^2$ and $h^3$ and the bar $H^4$ is such that when one of the side wings is at right angles to the plate H' the other wing is in alinement therewith. By reference to Fig. 13 it will be seen that the wing $H^3$ is in position to coöperate with the plate H' to form a guide for the bottle as it is delivered from the end of the conveyer, while the other wing $H^2$ is thrown backwardly against the bar $H^4$. When the bar $H^4$ is moved from the position shown in full lines to that shown in dotted lines through engagement with the side of the leer or any other obstruction, the positions of the wings are reversed—namely, to those indicated by dotted lines.

The conveyer comprises a series of links each consisting in parallel sides $g^4$ and $g^5$, which are pivotally secured to the corresponding ends of adjacent links. The sides of each link are united by a cross-piece $g^3$, in which is a socket having a depression near the center thereof. Mounted upon each link is a removable pan of a cross-section corresponding to that of the article to be carried thereby. Each pan $g$ is provided with a tongue $g^2$ of a width corresponding to the socket in the cross-piece $g^3$ of the link and is provided with a boss adapted to seat within the recess in the wall of the socket. The pan is consequently readily removable from each link, so that in case the same becomes damaged by the wearing away of the asbestos lining $g'$ or in any other manner a new pan may be substituted. When different-shaped articles are to be carried, pans of corresponding cross-section may be secured to the links.

*The leer and endless belt within the same.*—Reference character L indicates an annealing-oven or leer, through the sides L' and $L^2$ of which extend flues $l'$ and $l^2$, communicating with furnaces for generating the necessary heat to perform the annealing of the ware. The front end of the oven is preferably closed by means of sliding doors $L^3$ and $L^4$, which depend from the top of the leer by any suitable form of hangers—such, for instance, as trolleys $l^5$ upon the doors engaging at rack $l$ upon the inner edge of the top of the leer. Any suitable means are provided for connecting the doors to the conveyer-frame, such means being shown as links $l^3$ and $l^4$. The doors are provided with openings through which the conveyer extends.

Extending longitudinally through the leer is a conveying-belt N, comprising a series of sections N', each of which is secured to a link $n'$ of a sprocket-chain. Interposed between the links beneath the sections of the belt are open links $N^2$, adapted to straddle the teeth on a pair of sprocket-wheels $m'$ and $m^2$, around which the apron is guided. The sprocket-wheels $m'$ and $m^2$ are mounted upon shafts M and $M^3$, the opposite ends of which are journaled in pairs of standards M' and M' and $M^2$ and $M^2$, respectively. Referring to Fig. 7, it will be seen that the sprocket-wheels rotate in a plane approximately at the center of the sections of the belt, and in order that the latter may be supported on either side plates $N^3$ and $N^4$ are provided, which are engaged by rollers $n^3$ and $n^4$ upon the under surfaces of the several sections N' of the belt. Other guide-plates $N^5$ and $N^6$ are provided, which are engaged by pairs of guide-wheels $n^5$ and $n^6$, secured beneath each of the sections N' of the belt. After the conveyer has completed its movement transversely across the leer it is necessary that the belt should be fed forward in order that when the conveyer commences its return movement across the leer the row of bottles previously deposited may be moved forward, leaving a space for the subsequent row. Such movement of the belt is effected by the following mechanism: A worm-wheel $m^3$ is fixed upon the end of the shaft $M^3$ which projects beyond the bearing in the post $M^2$. A motor of any suitable type, O, is provided for moving the belt through the interposed mechanism. A sprocket-chain $o$ (see Fig. 1) passes around a sprocket-wheel rotated by the motor and also around a sprocket-wheel $p$, fixed upon the end of the shaft P, mounted in bearings in suitable supports Q' and $Q^3$. The opposite end of the shaft P is provided with a gear-wheel P', (see Fig. 17,) which meshes with a gear-wheel R', fixed upon a shaft R, journaled in suitable bearings and disposed parallel with the shaft P. A lever $r'$ is pivotally mounted upon the outer face of the gear-wheel R and extends radially across the same beyond pins $p'$, fixed upon the outer surface of the gear-wheel P'. Several of the teeth on the gear-wheel R' are broken out, so that when the space where the teeth are omitted is opposite the teeth on the gear-wheel P' the latter may rotate freely without imparting motion to the gear-wheel R. A spring $r^2$ normally retains the lever $r'$ out of the path of the pins $p'$. The opposite end of the shaft R is provided with a gear-wheel $R^2$, which meshes with a gear-wheel $S^2$, fixed upon a shaft S, suitably journaled beneath the shaft R. A gear-wheel S' is fixed upon the shaft S and meshes with a gear-wheel T'. A worm $T^2$ is fixed upon the shaft T and meshes with the worm-wheel $m^3$, fixed upon the shaft $M^3$, upon which the sprocket-wheel $m^2$, which drives the belt, is secured.

Journaled upon suitable framework above the shafts P and R is a short shaft U, from which depends a finger U' and engages at its lower end the exterior surface of the end of the lever $r'$. A crank-arm $U^2$ is fixed upon the shaft U and is connected, by means of a link $u^2$, to a cam $U^3$. A shoulder $u^3$ is formed upon the periphery of the cam $U^3$, which is normally engaged by a shoulder $u^4$, formed on a link $U^4$. A coil-spring $u^5$ connects one end of the link $U^4$ with a suitable frame and normally retains the link in the position shown in Fig. 16. A rod $U^5$ or other suitable power connection extends from the link $U^4$ to a bell-crank lever $D^9$.

A lever $D^5$ is fulcrumed at $d^5$ upon the table D and extends in opposite directions from its fulcrum, as shown in Fig. 5. The end of the lever $D^5$ projects beneath the cross-beam $e^8$ and presses through a slot $e^{12}$, formed in the lower edge of a plate $E^{12}$, secured to the cross-beam $e^8$. (See Fig. 6.) Flexible connections $D^6$ and $D^7$ extend from points $d^6$ and $d^7$ at opposite sides of the fulcrum $d^5$ of the lever $D^5$ and are united at their opposite ends by means of a link $D^8$ to the bell-crank lever $D^9$, the latter being pivotally mounted upon a post $d^4$, which is supported upon an extension $D^4$ of the table D.

The various portions of the apparatus which support the bottles or other articles are preferably lined with asbestos, so as to prevent the injury thereof by the heat of the articles. The series of holders $c'$ and $c^2$, the chutes $C^3$ and $C^4$, and the pans secured to the links of the conveyer G are indicated in Fig. 2 of the drawings as being lined with a suitable heat-resisting material, as asbestos.

The operation of my invention is as follows: The bottles or other articles are placed in the holders $c'$ and $c^2$ and by them are carried to points above the upper end of the chute $C^3$, into which they fall by gravity and slide downwardly into the chute $C^4$, which is carried by the conveyer-frame and by the latter guided to the conveyer G. The rotation of the motor C through the interposed power connections imparts motion to the carriers, consisting in the pairs of sprocket-chains $C'$ and $C^2$ and the series of holders $c'$ and $c^2$ supported thereby. The motor C, through the previously-described power connections, also imparts motion to the conveyer G, so that as the articles are successively deposited thereon they are carried into the leer and deposited in an upright position upon the belt N. As each bottle passes beneath the fender $k^4$ the shaft K is rocked, thereby exerting a strain upon the rod $K^6$, which oscillates the cam $k^6$, and thereby swings the lever $K^7$, which in turn rocks the bell-crank lever $K^8$ and forces the lever $f^6$ into the path of movement of the pins $f^4$, thereby rotatably connecting the shaft $F^5$ with the shaft $F^3$, the latter being constantly rotated through the power connections interposed between the same and the motor C. The rotation of the shaft $F^5$ is communicated to the shaft $F^7$, which in turn, through the worm $F^8$ and worm-wheel $f^9$, rotates the shaft $F^9$, and with it the mutilated beveled gears $F^{10}$ and $F^{11}$. The stub-shaft $f^{12}$ is rotated in one direction or the other, according to whether the teeth on the beveled gear $F^{10}$ or $F^{11}$ are in engagement with the teeth on the beveled gear $F^{12}$. The rotation of the shaft $f^{12}$, through the engagement between the gear-wheel $F^{13}$ thereon with the fixed segmental rack-back $D^{13}$, effects a swinging movement of the conveyer-frame such a distance that the lower end thereof is moved transversely across the leer a space corresponding to the diameter of one of the bottles. The size of the gear-wheel $F^6$ is so related to the gear-wheels interposed between the same and the fixed rack $D^{13}$ that a single rotation of the gear-wheel $F^6$ results in the movement of the conveyer-frame the desired distance. Consequently the passage of each bottle beneath the fender $k^4$ effects a single rotation of the gear-wheel $F^6$, as further rotation thereof is prevented by the space from which the teeth are omitted coming opposite the teeth on the gear-wheel $F^4$. It will of course be understood that after each bottle has passed from under the fender the weight thereon will cause it to descend to its normal position, thereby rocking the cam $k^6$ and permitting the spring $f^{14}$, which engages the lever $k^6$, to move the latter out of the path of movement of the pins $f^4$. The number of teeth on the mutilated beveled gears $F^{10}$ and $F^{11}$ is such that when the conveyer-frame has completed a transverse movement across the leer the teeth on one of the beveled gears have passed out of mesh with the teeth on the beveled gear $F^{12}$, and the teeth on the other mutilated beveled gear $F^{10}$ or $F^{11}$ come into mesh with the teeth on the beveled gear $F^{12}$, and thereby reverse the rotation of the stub-shaft $f^{12}$, and consequently reverse lateral movement of the conveyer-frame across the leer. The conveyer-frame is consequently swung from side to side automatically and the bottles thereby deposited in regular rows upon the belt within the leer. When the conveyer-frame is moved in the direction indicated by the arrow in Fig. 2, the guides at the end thereof are in the position shown. When, however, the conveyer-frame completes its movement toward the side wall L² of the leer, the position of the wings of the guides is reversed by reason of the contact of the actuating-bar H⁴ engaging the interior surface of the wall of the leer. Each time the conveyer-frame is moved laterally a space is formed between the bottle previously deposited and the projected wing to receive the following bottle. Consequently all danger of the bottles falling down is avoided, and the bottles are thereby deposited in regular rows. After the conveyer-frame has completed a movement across the leer the lever D⁵ has been oscillated through the engagement of the end thereof with the guideway formed in the plate E¹², fixed upon the conveyer-frame, and tension thereby exerted upon one or the other of the flexible connections D⁶ or D⁷. The tension exerted upon such flexible connection oscillates the bell-crank lever D⁹ and produces a strain upon the rod U⁵, which pulls the link U⁴ (see Fig. 16) against the tension of the spring $u^5$ and through the engagement of the shoulder $u^4$ thereon with the shoulder $u^3$ on the cam the latter is oscillated. The oscillation of the cam through the link U⁴ and crank-arm U² rocks the shaft U, which swings the depending finger U' toward the gear-wheel P' and moves the end of the lever $r'$ into the path of movement of the pins $p'$ on the face of the gear-wheel P'. The gear-wheel P' is constantly rotated by the motor O through the interposed power connections, and such rotary motion is then imparted to the gear-wheel R', owing to one of the pins $p'$ engaging the end of the lever $r'$ and moving the gear-wheel R' to such a position that the teeth thereon are engaged by the teeth on the gear-wheel P'. The rotation of the gear-wheel R' is communicated to the shafts S and T, and through the worm on the latter the worm-wheel $m^3$ on the shaft M³ is rotated such a distance that the belt N will be moved longitudinally within the leer a distance corresponding to the diameter of one of the bottles, thereby moving the row of bottles which has been completed a step, so that a space is formed to receive the succeeding row of bottles. The size of the gear-wheels interposed between the motor O and the worm $m^3$ is such that a single rotation of the gear-wheel R' moves the belt the requisite distance. Consequently when the gear-wheel R' completes a rotation the portion thereof where the teeth are omitted comes opposite the teeth on the gear-wheel P', and the latter then rotates without imparting rotary movement to the gear-wheel R' until another row of bottles has been completed and the bell-crank lever D⁹ actuated by the movement of the conveyer-frame. In order that the bottles in the first row which is formed within the leer may be prevented from falling in a direction away from the end of the conveyer, a guard Y is located upon one of the sections of the belt to serve as a stop against which the first row of bottles are deposited. This guard may be in the form of a plate held in an upright position by foot extensions $y$ $y$, as shown in Fig. 2. It is evident that after the first row of bottles has been deposited the bottles in the subsequent rows will be prevented from falling in a direction away from the end of the conveyer through contact with the bottles in the preceding row. Different-sized gears may be substituted in the pairs $f^5$ $f^7$ and R² S² to adjust the apparatus for different-sized articles. When the step-by-step movement of the belt through the leer has carried the first row of bottles out of the delivery end of the leer, they may be removed by an attendant. It is also evident that at each movement of the belt a completely annealed row of articles will be carried outside of the delivery end of the leer in position to be removed. The leer is shown as broken away in Figs. 1 and 2; but it is of course to be understood that the length of the leer is such that the travel of the successive rows of bottles therethrough from the point at which they are delivered by the conveyer to a point outside of the delivery end of the leer is such as to subject the bottles or the articles to the heat within the leer a sufficiently long interval to produce the requisite annealing process.

From the foregoing description it will be observed that I have invented an improved apparatus for carrying articles of glassware and other ware from the point where they are formed into the desired shapes to and through an annealing-oven in which the articles are delivered alternately from a pair of carriers, into which they are placed after being formed upon a conveyer, and carried thereby into the oven and there deposited in rows. It will be further observed that upon the deposit of each article in the leer the conveyer-frame is automatically moved transversely within the leer a distance corresponding to the width of the article and that a space is formed between a guide and the article last deposited to receive the following article, such guide being automatically brought into position prior to the commencement of the movement of the conveyer in a new lateral direction across the leer. It will be further observed that the belt upon which the articles are deposited in the leer is automatically moved away from the end of the conveyer a distance corresponding to the width of the row of articles upon the completion of each movement of the conveyer across the leer.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. The combination with a leer, of a belt movable therethrough, a conveyer for carrying the ware to be annealed to and delivering it upon said belt, and mechanism for automatically moving the delivery end of said conveyer step by step transversely across said belt as the articles of ware are delivered therefrom.

2. The combination with a leer, of a conveyer extending into the leer for delivering articles of ware thereinto, and mechanism for automatically moving the conveyer across the leer step by step as the articles of ware are delivered from the conveyer.

3. The combination with a leer, of a conveyer extending into the leer for delivering articles of ware thereinto, mechanism for automatically moving the conveyer across the leer step by step as the articles of ware are delivered from the conveyer, and means for automatically reversing the direction of movement of the conveyer upon the completion of its traverse across the leer in each direction.

4. The combination with a leer, of a belt movable therethrough, a conveyer for carrying the ware to be annealed to and delivering it upon said belt, mechanism for automatically moving the delivery end of said conveyer step by step transversely across said belt as the articles of ware are delivered therefrom, and means actuated by each article on the conveyer as it passes a given point for putting into operation said mechanism.

5. The combination with a leer, of a conveyer extending into the leer for delivering articles of ware thereinto, mechanism for automatically moving the conveyer across the leer step by step as the articles of ware are delivered from the conveyer, and means actuated by each article on the conveyer as it passes a given point for putting into operation said mechanism.

6. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, and automatic means for swinging said frame step by step about its pivot after the delivery of each article upon the belt.

7. The combination with a leer, of a conveyer extending into the leer for delivering articles of ware thereinto, a frame for supporting said conveyer pivoted at one end and terminating at its other end within said leer, and automatic means for swinging said frame step by step about its pivot after the delivery of each article into the leer.

8. The combination with a leer, of a conveyer extending into the leer for delivering articles of ware thereinto, a frame for supporting the conveyer pivoted at one end, a platform upon which the frame is movably supported intermediate of its ends, a rack fixed upon said platform, a gear-wheel carried by the conveyer-frame and meshing with said rack, and means for intermittently imparting rotary motion to said gear-wheel and thereby through its engagement with said rack moving said frame laterally about its pivot.

9. The combination with a leer, of a conveyer extending into the leer for delivering articles of ware thereinto, a frame for supporting the conveyer pivoted at one end, a platform upon which the frame is movably supported intermediate of its ends, a rack fixed upon said platform, a gear-wheel carried by the conveyer-frame and meshing with said rack, and means actuated by each article on the conveyer as it passes a given point for imparting rotary motion to said gear-wheel and thereby through its engagement with said rack moving said frame laterally about its pivot.

10. The combination with a leer, of a conveyer extending into the leer for delivering articles of ware thereinto, a frame for supporting the conveyer pivoted at one end, a platform upon which the frame is movably supported intermediate of its ends, a rack fixed upon said platform, a gear-wheel carried by the conveyer-frame and meshing with said rack, means actuated by each article on the conveyer as it passes a given point for imparting rotary motion to said gear-wheel and thereby through its engagement with said rack moving said frame laterally about its pivot, and means for reversing the direction of rotation of said gear-wheel when the conveyer completes its traverse across the leer in each direction.

11. The combination with a leer, of a conveyer extending into the leer for delivering articles of ware thereinto, a frame for supporting the conveyer pivoted at one end, a platform upon which the frame is movably supported intermediate of its ends, a rack fixed upon said platform, a vertical shaft journaled upon said frame, a gear-wheel fixed upon said shaft and in mesh with said rack, a second gear-wheel also fixed upon said shaft, a pair of gear-wheels having teeth only on opposite halves of their peripheries adapted to alternately engage the teeth on said second gear-wheel, a shaft upon which said pair of gear-wheels are fixed, and means for intermittently rotating said last-mentioned shaft whereby the conveyer is swung step by step across the leer first in one direction and then in the other direction.

12. The combination with a leer, of a conveyer extending into the leer for delivering articles of ware thereinto, a frame for supporting the conveyer pivoted at one end, a platform upon which the frame is movably supported intermediate of its ends, a rack fixed upon said platform, a vertical shaft journaled upon said frame, a gear-wheel fixed upon said shaft and in mesh with said rack, a second gear-wheel also fixed upon said shaft, a pair of gear-wheels having teeth only on opposite halves of their peripheries adapted to alternately engage the teeth on said second gear-wheel, a shaft upon which said pair of gear-wheels are fixed, and means actuated by each article on the conveyer as it passes a given point imparting a rotary motion to said last-mentioned shaft whereby the conveyer is swung step by step across the leer first in one direction and then in the other direction.

13. The combination with a leer, of a conveyer extending into the leer for delivering articles of ware thereinto, a frame for supporting the conveyer pivoted at one end, a platform upon which the frame is movably supported intermediate of its ends, a rack fixed upon said platform, a vertical shaft journaled upon said frame, a gear-wheel fixed upon said shaft and in mesh with said rack, a second gear-wheel also fixed upon said shaft, a pair of gear-wheels having teeth only on opposite halves of their peripheries adapted to alternately engage the teeth on said second gear-wheel, a shaft upon which said pair of gear-wheels are fixed, a constantly-running power-shaft, and a clutch actuated by each article on the conveyer as it passes a given point for rotatably connecting said second shaft to said power-shaft whereby the conveyer is swung step by step across the leer first in one direction and then in the other.

14. The combination with a leer, of a belt movable therethrough, a conveyer for carrying the ware to be annealed to and delivering it upon said belt, mechanism for automatically moving the delivery end of the conveyer step by step transversely across said belt as the articles of ware are delivered thereon, and means for automatically moving said belt longitudinally upon the completion of the movement of the delivery end of the conveyer across the belt.

15. The combination with a leer, of a belt movable therethrough, a conveyer for carrying the ware to be annealed to and delivering it upon said belt, mechanism for automatically moving the delivery end of the conveyer step by step transversely across said belt as the articles of ware are delivered thereon, and operative connections between said conveyer and belt for moving the latter longitudinally with respect to the leer upon the completion of each transverse movement of the conveyer across the belt.

16. The combination with a leer, of a belt movable therethrough, a conveyer for carrying the ware to be annealed to and delivering it upon said belt, mechanism for automatically moving the delivery end of the conveyer step by step transversely across said belt as the articles of ware are delivered thereon, a motor for moving said belt, a clutch for operatively connecting said motor to said belt, and means operated by said conveyer upon the completion of each transverse movement thereof for actuating said clutch.

17. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, means for reversing the direction of movement of said frame, and operative connections between said frame and belt for moving the latter longitudinally with respect to the leer when the direction of movement of the frame is reversed.

18. The combination with the leer, of a belt movable longitudinally within the leer, a conveyer for carrying the ware to and delivering it upon said belt, a frame for supporting the conveyer pivoted at one end, a platform upon which the frame is movably supported, a meshed rack and gear-wheel supported by said platform and frame, and means for intermittently imparting rotary motion to said gear-wheel and thereby through its engagement with said rack moving said frame laterally about its pivot.

19. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, a platform upon which said frame is movably supported, and means for moving said belt controlled by the movement of said frame relatively to said platform.

20. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, a platform upon which said frame is movably supported, a motor for moving said belt, and means operated by the relative movement between said frame and platform for rendering said motor effective to move said belt.

21. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, a platform upon which said frame is movably supported, a lever pivotally mounted upon said platform, connections between said lever and said frame whereby movement of the latter oscillates said lever, and means controlled by said lever for moving said belt.

22. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, means for reversing the direction of movement of said frame, a lever pivotally mounted upon said platform, stops on said frame into the path of movement of which one end of said lever extends whereby said lever is oscillated when the direction of movement of said frame is reversed, and means controlled by said lever for moving said belt.

23. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, means for reversing the direction of movement of said frame, a lever pivotally mounted upon said platform, stops on said frame into the path of movement of which one end of said lever extends whereby said lever is oscillated when the direction of movement of said frame is reversed, a motor for imparting movement to said belt, a clutch for operatively connecting said motor to said belt, and an operative connection between said lever and said clutch.

24. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, means for reversing the direction of movement of said frame, a lever pivotally mounted upon said platform, stops on said frame into the path of movement of which one end of said lever extends and whereby said lever is oscillated when the direction of movement of said frame is reversed, a bell-crank lever mounted upon said frame, flexible connections leading to one arm of said bell-crank lever from said first lever at points on opposite sides of its fulcrum, a motor for imparting movement to said belt, and clutch for operatively connecting said motor to said belt, and operative connections between the other arm of said bell-crank lever and said clutch.

25. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, a lever pivotally mounted upon said platform one end of which engages said frame, a motor for moving said belt and connections interposed between said lever and motor for rendering the latter operative to move said belt.

26. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, a bell-crank lever pivoted on said platform, connections extending to one arm of said bell-crank lever from said first lever at points at opposite sides of its fulcrum, a motor for moving said belt, and a connection extending from the other arm of said bell-crank lever for rendering said motor operative to move said belt.

27. The combination with a leer, of a conveyer extending into the leer for delivering articles of ware thereinto, mechanism for automatically moving the conveyer across the leer as the articles of ware are delivered therefrom, a sliding door closing the end of said leer and having an opening through which the conveyer extends, and connections between said door and the conveyer whereby the door is moved laterally by the conveyer.

28. The combination with a leer, of a belt movable therethrough, a conveyer for carrying the ware to be annealed to and delivering it upon said belt, mechanism for automatically moving said conveyer step by step across said belt, guides supported at the end of said conveyer and projecting beyond the delivery end thereof.

29. The combination with a leer, of a conveyer extending into the leer for delivering articles of ware thereinto, mechanism for automatically moving the conveyer across the leer step by step as the articles of ware are delivered from the conveyer, means for automatically reversing the direction of movement of the conveyer upon the completion of its traverse across the leer in each direction, guides movable with said conveyer and projecting beyond the delivery end thereof, and means for automatically reversing the positions of said guides when the direction of movement of the conveyer is reversed.

30. The combination with a leer, of a conveyer extending into the leer for delivering articles of ware thereinto, mechanism for automatically moving the conveyer across the leer step by step as the articles of ware are delivered from the conveyer, means for automatically reversing the direction of movement of the conveyer upon the completion of its traverse across the leer in each direction, swinging guides supported at either side of the delivery end of the conveyer, and means for automatically projecting said guides forwardly and laterally according to the direction of movement of the conveyer.

31. The combination with a leer, of a belt movable therethrough, a conveyer for carrying the ware to be annealed to and delivering it upon said belt, a frame for supporting said conveyer pivoted at one end and terminating at its other end adjacent to the upper surface of said belt, automatic means for swinging said frame step by step about its pivot after the delivery of each article upon the belt, means for reversing the direction of movement of said frame, a sliding bar guided upon said frame the ends of which extend laterally beyond the frame, guides pivotally secured to either side of the lower end of said frame, pivotal connections between said guides and said bar whereby one guide is projected forwardly and the other guide laterally.

32. In a device of the character described, the combination with a leer, of a conveyer extending into the leer for delivering articles of ware thereinto, a pair of endless carriers for delivering articles to the conveyer, holders for the articles of ware supported by the carriers and so arranged that articles are delivered alternately upon the conveyer from the carriers.

33. The combination with a leer, of a belt movable therethrough, a conveyer for delivering articles of ware upon said belt, means for pivotally supporting said conveyer at one end, means for swinging said conveyer about its pivot, a pair of endless conveyers for delivering articles upon said conveyer at points adjacent to its pivotal support.

In testimony whereof I sign this specification in the presence of two witnesses.

FRANK A. SHUNK.

Witnesses:
 J. A. CURRY,
 L. E. JORDAN.